United States Patent [19]

Hempenius et al.

[11] 4,271,200
[45] Jun. 2, 1981

[54] METHOD OF PREPARING A FROZEN PIZZA

[75] Inventors: Walter L. Hempenius, Cary; June E. Yantis, Barrington, both of Ill.

[73] Assignee: The Quaker Oats Company, Chicago, Ill.

[21] Appl. No.: 63,997

[22] Filed: Aug. 6, 1979

[51] Int. Cl.³ .............................................. A21D 8/00
[52] U.S. Cl. ...................................... 426/27; 426/19; 426/23; 426/95; 426/302; 426/391; 426/293; 426/496
[58] Field of Search ................ 426/95, 524, 391, 296, 426/94, 19, 23, 27, 302, 293, 496

[56] References Cited

U.S. PATENT DOCUMENTS

| | | | |
|---|---|---|---|
| 2,774,316 | 12/1956 | Daino | 426/496 |
| 3,892,868 | 7/1975 | Klingler | 426/94 |
| 4,020,184 | 4/1977 | Chesner | 426/94 |

*Primary Examiner*—Joseph M. Golian
*Assistant Examiner*—Elizabeth A. Hatcher
*Attorney, Agent, or Firm*—James T. FitzGibbon

[57] ABSTRACT

A frozen pizza and method. The pizza includes a frozen crust portion and a filling portion for receiving the pizza sauce or other filling. The crust includes a generally flat filling-receiving center section of predetermined thickness, height and density, and this center section is surrounded by an edge portion which is formed integrally with the center section portion. The edge portion is of increased height and decreased density with respect to the respective height and density of the center section portion. The edge portion has an inner sidewall which serves to confine the filling portion to the center section of the pizza product. The method includes the steps of permitting limited rise of the dough during crust formation, and then depressing or debossing the center section of the dough sheet to increase its density and reduce its height, while permitting the outer margin of the sheet to rise naturally to greater height and to assume a reduced density.

3 Claims, 8 Drawing Figures

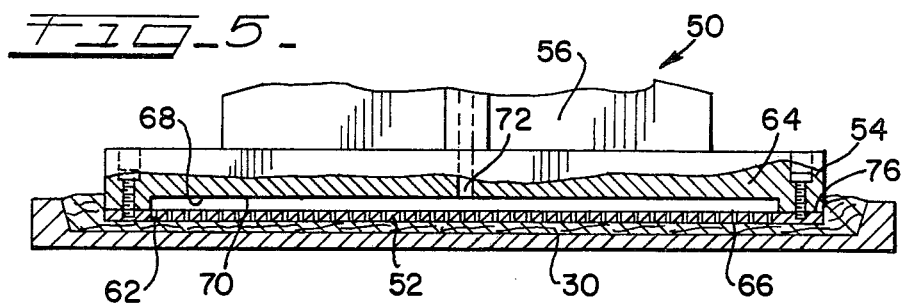
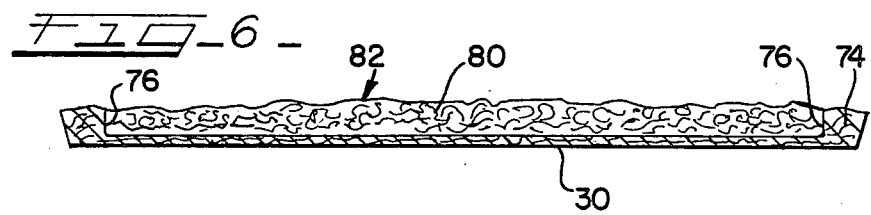
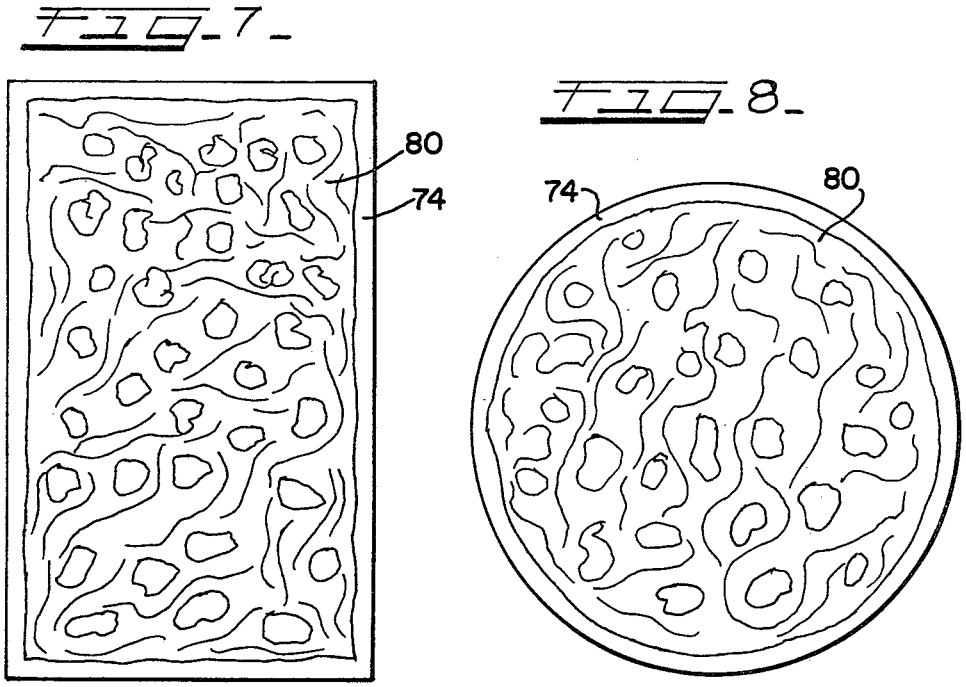

METHOD OF PREPARING A FROZEN PIZZA

The present invention relates generally to prepared specialty food products and methods of making them, and more particularly, to frozen food products of uniformly high quality which are adapted to be manufactured on a large scale at reasonable costs.

One specific food product with which the invention is principally concerned is a so-called frozen pizza, comprising a crust portion and a filling or topping portion, with such pizza being manufactured under the controlled conditions described herein for sale in the frozen state to grocers or distributors for ultimate consumption by the public.

With the advent of convenience foods generally, frozen pizzas have increased in popularity and there is signficant economic competition in the manufacture and distribution of frozen pizzas. Consequently, methods which provide the manufacturer of such products with the ability to provide high and consistent quality at reasonable costs are of great economic importance. According to the invention, the novel methods make it possible to manufacture a pizza product having novel characteristics, and still further, such methods assist the manufacturer in maintaining relatively exact control over the quantity of ingredients used in the filling and the overall character and appearance of the finished product.

Another aspect of the invention is the provision of a method wherein the crust portion of the pizza product requires minimum use of special forming equipment and makes possible the re-use of such equipment for minimizing processing costs.

In the manufacture of products such as frozen pizzas, it is customary to form and bake the crust of the product, and then fill the product with a filling or topping material comprised of a sauce which includes a variety of ingredients. After being filled with a combination of a pre-cooked sauce and other ingredients which have not been previously cooked, the pizza or like product is frozen, cartoned, re-packaged in shipper cases and sold to distributors and/or grocers for ultimate consumption by the public.

A so-called deep dish pizza, one of the products with which the invention is concerned, usually contains a relatively high percentage of filling or topping material in relation to the amount of crust. This, in turn, requires that the pizza be formed or shaped so as to contain the topping ingredients within the center portion of the crust during the time the product is being processed. While this can be accomplished without trouble in hand made pizzas, manufacture of crusts with proper edges has created problems in mass production, particularly where pizza crusts are made from individual dough balls.

According to the present invention, advantage is taken of the rising or so-called "proofing" characteristics of the pizza dough during a portion of its preparation so that the natural rising characteristics of the dough may be used, in conjunction with special pressing or similar equipment, to create a rim or edge of crust material which will serve to confine the ingredients of the filling within the margins of the crust. An advantage of the present invention is that this method is compatible with existing materials, it does not require the preparation of curst which must rise to a significant height and which must be supported during pizza manufacture.

Moreover, an advantage of the present invention is the provision of a marginal crust portion which is of reduced density but relatively uniform cross-section for compatibility with cooking requirements. In other words, where a product such as a pizza crust is to be prepared by baking, the degree to which the product is baked depends not only on oven time and temperature, but also on the ratio of the volume of the crust to its surface area. Where there is excessive surface in respect to the volume and weight of the product to be cooked, such area tends to be overcooked, while under conditions where the mass and/or volume are great in relation to the surface area, the product tends to be less completely cooked in the same time at the same temperature.

Inasmuch as certain prior art frozen pizza products have required special processing equipment, or have been difficult to manufacture because of failure to make a satisfactory rim or margin to contain the ingredients, it is an object of the present invention to provide an improved frozen pizza product.

Another object is to provide a method of manufacturing a frozen pizza which advantageously utilizes the rising characteristics of the dough comprising the crust to manufacture an edge or margin which will retain the filling ingredients during preparation of such pizza product.

A still further object of the present invention is to provide a method of manufacturing frozen pizzas in batch form which minimizes the requirement for special processing equipment.

Another object of the invention is to provide a pizza product and method which makes possible the manufacture of a deep dish type pizza having a relatively large amount of filling in relation to the volume and weight of the crust thereof, and which is easy to manufacture while maintaining very careful control over the quantity and distribution of the ingredients therein.

Yet another object is to provide a frozen pizza or like specialty prepared food product which is able to be manufactured at reasonable costs without the use of special processing methods or expensive equipment.

Another object is to provide a pizza-making method which includes the steps of forming a dough ball for the crust portion, pressing the ball into a flat sheet and then reforming the sheet after partial rise into a low density, raised outer margin and a depressed, higher density center crust section, and thereafter filling the crust with a topping sauce and freezing the resulting product for packaging, sale and ultimate consumption by the consumer.

The invention achieves its objects and advantages, including its inherent objects and advantages, by providing a pizza product comprised of a crust and a sauce or filling portion, with the crust comprising a major central area having a relatively high density, and a margin portion extending around the outer edge of the pizza, with the marginal portion being of raised cross-section, and having a lower density than the density of the central area.

The invention also achieves its objects by providing a method which includes the steps of pressing a ball of pizza dough to pre-form it into a flat sheet, permitting a limited rise of the sheet as a whole, and subsequently pressing or debossing a central area of the pizza crust thus formed to increase the density thereof in the central portion, and to leave a defined marginal edge of unconfined pizza dough, thus creating a product having a depressed, higher density central section surrounded by a rim or margin of lower density and greater physical height, baking the crust substantially immediately thereafter to a just rigid structure, filling the crust with a topping material and freezing the pizza for subsequent storage and distribution. The exact manner in which these and other objects of the advantages are achieved in practice will become more clearly apparent when reference is made to the following description of the preferred embodiments of the invention set forth by way of example and shown in the accompanying drawings, in which like reference numbers indicate corresponding parts throughout.

BRIEF DESCRIPTION OF THE DRAWINGS

FIG. 5 is a side view, with portions broken away, showing the construction of one of the press platens used in performing the method of the invention;

FIG. 6 is a vertical sectional view showing one form of a completed product made according to the invention;

FIG. 7 is a top plan view illustrating a rectangular form of food product made according to the invention; and FIG. 8 is a top plan view showing an alternate form of food product made according to the present invention, and such form having a circular shape when viewed from the top.

DESCRIPTION OF THE PREFERRED EMBODIMENTS OF THE INVENTION

While it will be understood that the principles of the invention are applicable to other analagous frozen food products, a description of the invention will be made with reference to an embodiment wherein a product is a frozen pizza, made by the dough ball or batch method of making such pizza. A smaller or individual size pizza and the method of making it will be described, although it will be understood that the methods are also applicable to manufacture of different forms and sizes of pizza and like products.

Figure 1:
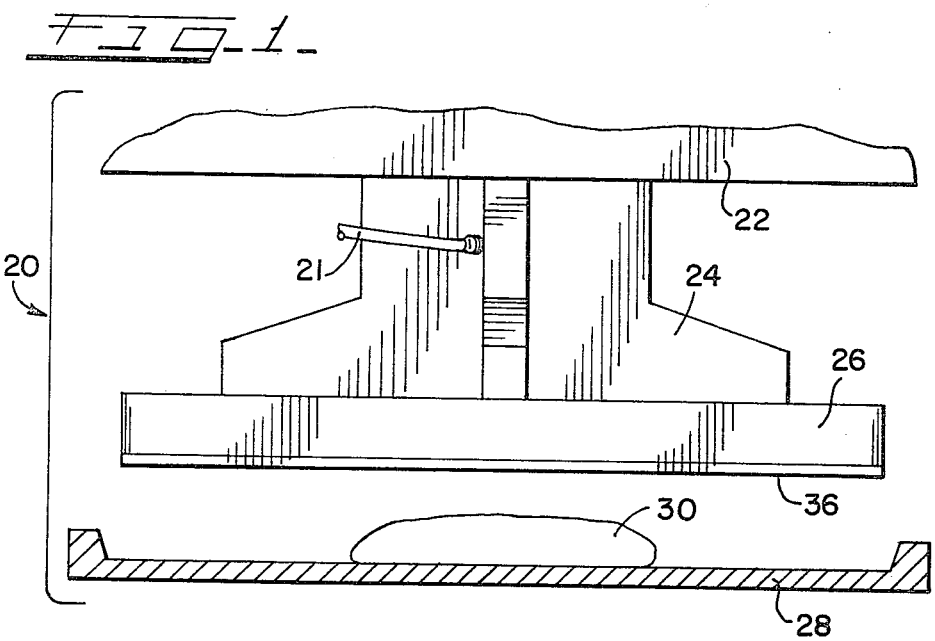
FIG. 1 is a side elevational view, with portions in section, illustrating the first step in the manufacture of the prepared food product of the invention, and showing a dough receptacle, a first press unit and a ball of crust-forming dough disposed in the receptacle.

Referring now to the drawings in greater detail, FIG. 1 shows one form of apparatus suitable for use with the invention, namely a first stage press unit generally designated 20 and shown to include an upper press plate 22, a ram assembly 24 and a platen assembly 26, all shown positioned above a crust-receiving processing pan 28 which receives a ball of bread type, crust-forming dough 30 to be described herein.

Figure 2:
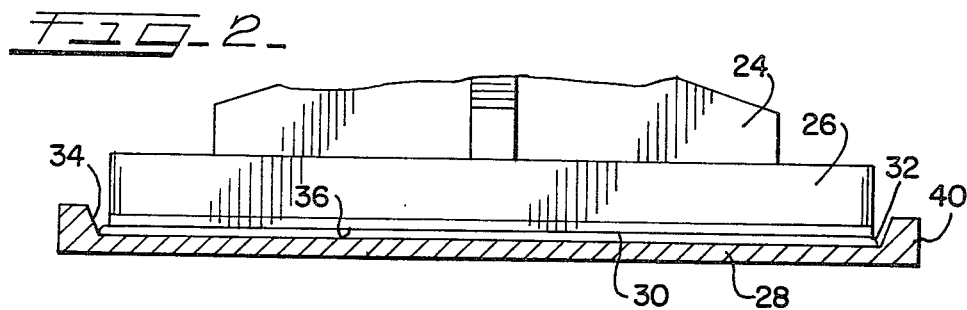
FIG. 2 is a view similar to FIG. 1, but showing the press unit in a lowered position, forming a flattened crust from the dough ball.

FIG. 2 shows the first stage press 20 in the lowered position thereof, with the dough 30 being formed into a thin, flat sheet within the pan 28. As illustrated, the edges 32 of the sheet of dough 30 have expanded to a predetermined radial extent as determined at least in part by engagement thereof with the inclined inner sidewalls 34 of the pan 28. The ram 24, by moving to the lowered position, extrudes the dough 30 radially by reason of engaging it with the lower surface 36 of the platen 26.

Figure 3:
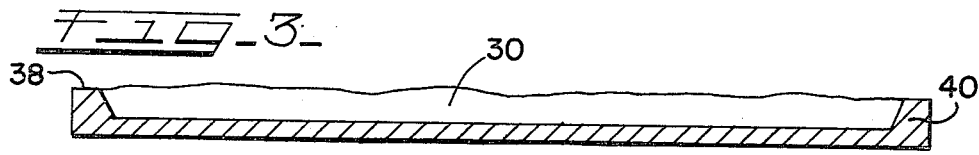
FIG. 3 shows the pizza dough and the receptacle of FIGS. 1 and 2 after the dough has risen or been "proofed" to a limited extent.

FIG. 3 shows that the dough 30 has risen substantially after having been initially compressed in the first stage pressing operation. The crust 30 which is in the process of being formed, is shown in FIG. 3 as having risen to the point where it is substantially equal in height to the horizontally extending annular top surface 38 of the rim 40 of the pan 28.

Figure 4:
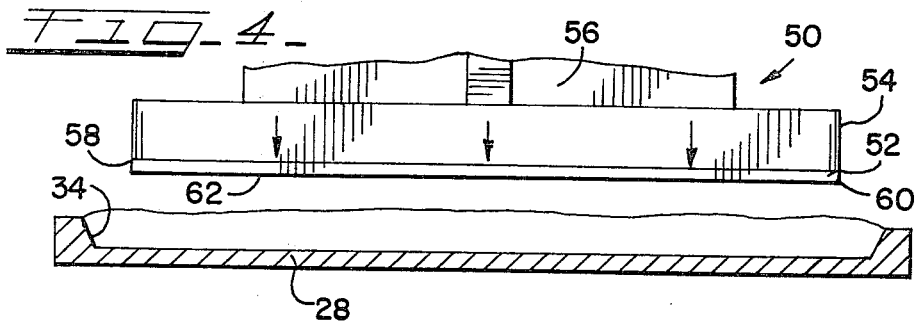
FIG. 4 shows a second press unit adapted to depress a portion of the dough to form a debossed or more dense center crust section.

Referring now to FIG. 4, a second stage press unit, generally designated 50, is shown. This press assembly, which is shown with portions broken away, will be understood to correspond substantially with its counterpart, the first stage press 20, except that the press 50 has a somewhat smaller bottom surface area than its counterpart. This press 50 includes a lower plate 52 disposed beneath a platen body 54 which is actuated by a ram 56. The outer cylindrical surface 58 of the platen assembly 54 is spaced radially inwardly from the inclined sidewall surface 34 of the pan 28 by a significant distance which, in a preferred form of the invention, is from about ⅝ to about ¾ of an inch. A relatively sharp lower edge 60 joins the cylindrical sidewall 58 of the platen assembly 54 to the bottom surface 62 of the platen 54, for purposes which will appear.

Referring now to FIG. 5, the ram 56 of the second stage press 50 is shown in a lowered position, with the bottom surface 62 of the lower plate 52 shown engaging and depressing a center section portion of the dough or crust 30. FIG. 5 shows that the platen assembly 54 includes a platen body 64, the lower plate 52 which includes a number of apertures 66, with the plate 52 and the lower surface 68 of the platen body 64 being spaced apart so as to define a plenum or air chamber 70 between these parts. A vertically extending central passage 72 provides means for filling the chamber 70 with a charge of air which escapes through the openings 66 when the ram 56 is raised, so as to insure that the pizza crust being formed will not adhere to the lower surface 62 of the platen 54.

Although not illustrated in detail, it will be understood that the internal construction of the ram and platen assemblies 24, 26 of the first stage press 20 are constructed in the same manner as their counterparts in the press shown in FIG. 5. In FIG. 1, air is shown to be supplied to a plenum (not shown in FIG. 1) through the supply line 21; this is also the case in the press 50 of FIGS. 4 and 5.

Referring now to FIG. 6, a completed pizza product made according to the invention is shown. This pizza includes a filling 80 lying within a depressed center section 82 defined by a raised edge portion 74 of reduced density. This raised edge portion 74 includes an inwardly directed sidewall 76 which serves to confine the filling ingredients of the pizza therein.

FIG. 6 shows the pizza product with the platen withdrawn and with a filling material generally designated 80 disposed within the recess formed by the depressed center section 82 in the pizza crust 30.

FIGS. 7 and 8 show that the edge 74 on the crust 30 may be appropriately formed in either round, square, or rectangular shaped pizzas, which may then be filled with the filling or topping material 80. According to the invention, when the second stage press unit is operated so as to raise the ram and platen, and to separate the crust therefrom, the crust is at least partially baked substantially immediately, so that further rising of the center section is prevented. Thus, a higher density reduced height center section portion remains as illustrated, with the increased height, lower density rim or edge portion also remaining as shown for purposes of confining the filling during the remainder of the pizza manufacturing operation.

Referring now to other details of the present invention, a pizza dough formulation is made from the following ingredients:

| Ingredient | Parts by Weight |
| --- | --- |
| Flour | 100 |
| Gluten | 1 |
| Salt | 1 |
| Dextrose | 1 |
| Yeast | 2 |
| Soy oil | 3 |
| Water | 50 |
| Ca propionate | ½ |
| Na meta-bisulfite | 90 ppm |

The ingredients referred to above are mixed in a conventional manner, that is, the flour, gluten, dextrose, salt, moist yeast, chemical additives, water and oil are placed in a dough mixer. The product is mixed at a slow speed for approximately two to three minutes and at a high speed for four to eight minutes, with the mixed product attaining a temperature of 95° F. and the proper state of dough development.

In the above formulation, the ingredients are conventional and are known to those skilled in the art. The calcium propionate retards spoilage and the sodium metabisulfite serves to lower the elastic memory of the dough, i.e., to reduce the elasticity or tendency thereof to return to its original shape so that it can be more easily pressed into and remain in flat sheet form.

This crust-making bread dough product is divided into a plurality of individual dough balls each having a weight of three ounces and adapted for making a small or individual size frozen pizza. After mixing, the dough is permitted to undergo primary "proofing" or rising for about ten minutes at 100° F.

Thereupon, an individual dough ball 30 is placed into the processing pan 28, the top plate 22 of the first stage press 20 is moved downwardly, causing the lower surface 36 of the platen 26 to engage the dough 30 and flatten it into a crust having edges 32 near the side walls 34 of the processing pan 28. These steps are depicted in FIGS. 1 and 2. Next, the top plate 22 and its associated press portions 24, 26 are raised (FIG. 3), permitting the dough to undergo additional rising, preferably for a period of from about ten to fifteen minutes at a preferred temperature of 100°–120° F. and 90–95% relative humidity.

At this point, the crust has risen to a total height of from ¼" up to ½" and typically about ⅜" in height, i.e., until it is approximately flush with the processing pan top edge surface 38. During this rising time, the processing pan 28 is removed from the first stage press and placed in a position of registry beneath the second stage press 50. After the elapse of the time referred to, the platen 54 of the second stage press 50 is lowered (FIG. 4) and ultimately contacts the dough as shown in FIG. 5, depressing the center section 82 of the dough and increasing the density of the dough beneath the plate 52. the relatively sharp edges 60 at the bottom of the plate 52 provide a virtual shearing action, thereby forming distinct side walls 76, in the crust material, as shown in FIGS. 5 and 6.

As soon as the depressed center section 82 has been formed in the crust 30, a charge of air is fed to the plenum 70, tending to escape through the apertures 66 and helping detach the pizza crust 30 from the lower surface 62 of the plate 52. Then, the ram 56 and platen 54 are rapidly raised, leaving the depressed, high density center crust section 82 in the dough 30. Next, the crust is immediately transferred to an oven where it is at least partially baked so that it will retain the shape shown in FIGS. 5 and 6, with the rim or margin portion 74 having an increased height and decreased density and surrounding the pizza crust to form an outer crust edge. After baking and cooling, the sauce or other topping ingredients are added to the crust and the pizza is frozen in a manner known to those skilled in the art. The formation of this edge or rim protects the contents during manufacture and storage, and during subsequent cooking, making an alternative form of deep dish style pizza. Moreover, because of the shape and cross section and density of the rim portion, the product cooks evenly and presents a palatable crust without either remaining uncooked or becoming unduly brown. As shown in FIGS. 7 and 8, the ultimate shape of the pizza may vary as desired by the maker. The radial thickness of the rim is typically ⅜" to ¾", but may lie outside these dimensions.

It will thus be seen that the present invention provides a novel pizza crust, pizza product and method, such articles and methods having a number of advantages and characteristics, including those pointed out herein and others which are inherent in the invention. A preferred embodiment of the invention having been described by way of example, it will be understood that modifications or changes may be made to the processes and products of the invention without departing from the spirit of the invention or the scope of the appended claims.

We claim:

1. A method of manufacturing a frozen pizza product, said method comprising preparing a leavened bread dough formulation from which a pizza crust may be formed, forming at least a portion of said dough into an individual dough ball, positioning said dough ball within a forming apparatus which includes a flat central portion and an at least partially vertically directed, circumferentially extending peripheral sidewall, permitting said dough portion to rise, exerting a first downward force on said dough ball with a first pressing platen unit having a given diameter and a flat, downwardly directed surface portion, thereby forming a thin flat dough sheet of substantially uniform density, with the outer periphery of said dough sheet extending sufficiently outwardly so as to lie closely adjacent said peripheral sidewall, permitting said flat sheet to undergo additional rising, subsequently exerting a second downward force on said dough sheet with a second pressing platen, said second pressing platen having a reduced diameter in respect to said given diameter of said first platen, said second platen also having a flat, downwardly directed surface, thereby depressing a central portion of said flat dough sheet to increase the density of said center section and to permit the outer margin of said sheet to rise naturally while confined only by said sidewall, and substantially immediately after depressing said central portion of said sheet, removing said sheet from said forming apparatus and at least partially baking said sheet while said center section remains depressed so as to create a pizza crust having a high density center section of reduced height and a raised margin of reduced density, adding to said pizza crust a pizza sauce filling preparation, and freezing said combination crust and filling portion into a frozen pizza product.

2. A method as defined in claim 1 wherein permitting said flat sheet to undergo additional rising comprises permitting said dough to rise from about ten to about fifteen minutes at a temperature of from about 100° to about 120° F., in an atmosphere of about 90% to 95% relative humidity.

3. A method as defined in claim 1 wherein said second pressing platen includes a sharp outer edge, and wherein forming said depressed central portion of said flat dough sheet includes shearing a portion of said dough sheet along a line defining the periphery of said sheet and spaced inwardly from the outermost edge thereof by contacting said dough sheet with said sharp outer edge.

* * * * *